United States Patent
Lanzerath et al.

(10) Patent No.: US 12,555,859 B2
(45) Date of Patent: Feb. 17, 2026

(54) BATTERY MOUNTING STRUCTURE FOR VEHICLE

(71) Applicant: Ford Global Technologies, LLC, Dearborn, MI (US)

(72) Inventors: Horst Heribert Lanzerath, Bad Muenstereifel (DE); Robert Reiners, Ypsilanti, MI (US); Mohamed Ridha Baccouche, Ann Arbor, MI (US); Fubang Wu, Woodhaven, MI (US); Vladimir Vladimirovich Bogachuk, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 773 days.

(21) Appl. No.: 17/859,750

(22) Filed: Jul. 7, 2022

(65) Prior Publication Data
US 2024/0014495 A1    Jan. 11, 2024

(51) Int. Cl.
*H01M 50/249* (2021.01)
*B60K 1/04* (2019.01)
*H01M 50/204* (2021.01)
*H01M 50/242* (2021.01)
*H01M 50/262* (2021.01)

(52) U.S. Cl.
CPC ............. *H01M 50/249* (2021.01); *B60K 1/04* (2013.01); *H01M 50/204* (2021.01); *H01M 50/242* (2021.01); *H01M 50/262* (2021.01); *B60K 2001/0438* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,950,748 B2 | 4/2018 | Ikeda et al. | |
| 10,549,619 B2 * | 2/2020 | Nakayama | H01M 50/204 |
| 11,148,520 B2 | 10/2021 | Chu et al. | |
| 2021/0351469 A1 | 11/2021 | Poloczek et al. | |

\* cited by examiner

*Primary Examiner* — Wyatt P McConnell
(74) *Attorney, Agent, or Firm* — Burris Law, PLLC

(57) ABSTRACT

A battery mounting structure includes a shear plate and a plurality of separate reinforcement plates. The shear plate extends in a longitudinal direction of the vehicle and includes a first thickness. The reinforcement plates are configured to be disposed between the shear plate and the battery housing assembly and are mounted on an upper surface of the shear plate. The reinforcement plates are spaced apart from each other and include a second thickness. The second thickness is greater than the first thickness.

20 Claims, 7 Drawing Sheets

BATTERY MOUNTING STRUCTURE FOR VEHICLE

FIELD

The present disclosure relates to a battery mounting structure for a vehicle, and a vehicle including a battery mounting structure.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these and other issues related to the integration of rechargeable battery packs in electric vehicles.

SUMMARY

This section provides a general summary of the disclosure and is not a comprehensive disclosure of its full scope or all of its features.

In one form, the present disclosure provides a battery mounting structure for mounting a battery housing assembly to a vehicle frame of a vehicle. The battery housing assembly includes a battery housing and batteries within the battery housing. The battery mounting structure includes a shear plate and a plurality of separate reinforcement plates. The shear plate extends in a longitudinal direction of the vehicle and includes a first thickness. The reinforcement plates are configured to be disposed between the shear plate and the battery housing assembly and are mounted on an upper surface of the shear plate. The reinforcement plates are spaced apart from each other and include a second thickness. The second thickness is greater than the first thickness.

In variations of the mounting structure of the above paragraph, which can be implemented individually or in any combination: the reinforcement plates are aligned with each other in the longitudinal direction of the vehicle; the reinforcement plates extend in a transverse direction of the vehicle; the shear plate is made of a first material and the reinforcement plates are made of a second material, the first material and the second material are different from each other; the first material has a greater ductility than the second material; the shear plate includes a fore end and an aft end, the shear plate includes a uniform thickness from the fore end to the aft end; the shear plate is flat; each reinforcement plate includes stiffening beads spaced apart in a transverse direction of the vehicle; the stiffening beads extend in the longitudinal direction of the vehicle; each reinforcement plate of the reinforcement plates is made of a different material; the shear plate includes stiffening beads spaced apart in a transverse direction of the vehicle; and the reinforcement plates are welded to the upper surface of the shear plate.

In another form, the present disclosure provides a battery mounting structure for mounting a battery housing assembly to a vehicle frame of a vehicle. The battery housing assembly includes a battery housing and batteries within the battery housing. The battery mounting structure includes a shear plate, a plurality of cross beams and a plurality of separate reinforcement plates. The shear plate extends in a longitudinal direction of the vehicle and includes a first thickness. The cross beams are secured to an upper surface of the shear plate and are configured to be secured to the battery housing assembly, the cross beams are spaced apart from each other and extend in a transverse direction of the vehicle. The reinforcement plates are configured to be disposed between the shear plate and the battery housing assembly and are mounted on an upper surface of the shear plate. Each reinforcement plate is disposed between two adjacent cross beams of the plurality of cross beams and include a second thickness. The second thickness is greater than the first thickness.

In variations of the mounting structure of the above paragraph, which can be implemented individually or in any combination: a set of fasteners extend through the shear plate, a respective cross beam of the cross beams, and configured to extend through the vehicle frame to secure the shear plate, the respective cross beam and the vehicle frame to each other; each reinforcement plate includes stiffening beads spaced apart in a transverse direction of the vehicle; and the stiffening beads extend in the longitudinal direction of the vehicle.

In yet another form, the present disclosure provides a vehicle comprising a battery housing assembly and a battery mounting structure. The battery mounting structure is configured to mount the battery housing assembly to a vehicle frame. The battery mounting structure includes a shear plate, a plurality of cross beams and a plurality of separate reinforcement plates. The shear plate extends in a longitudinal direction of the vehicle and includes a first thickness. The cross beams are secured to an upper surface of the shear plate and to the battery housing assembly. The cross beams are spaced apart from each other and extend in a transverse direction of the vehicle. The reinforcement plates are disposed between the shear plate and the battery housing assembly and are mounted on the upper surface of the shear plate. Each reinforcement plate is disposed between two adjacent cross beams of the plurality of cross beams and include a second thickness. The second thickness is greater than the first thickness.

In variations of the vehicle of the above paragraph, which can be implemented individually or in any combination: wherein the reinforcement plates are aligned with each other in the longitudinal direction of the vehicle and the reinforcement plates are vertically spaced apart from the battery housing assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
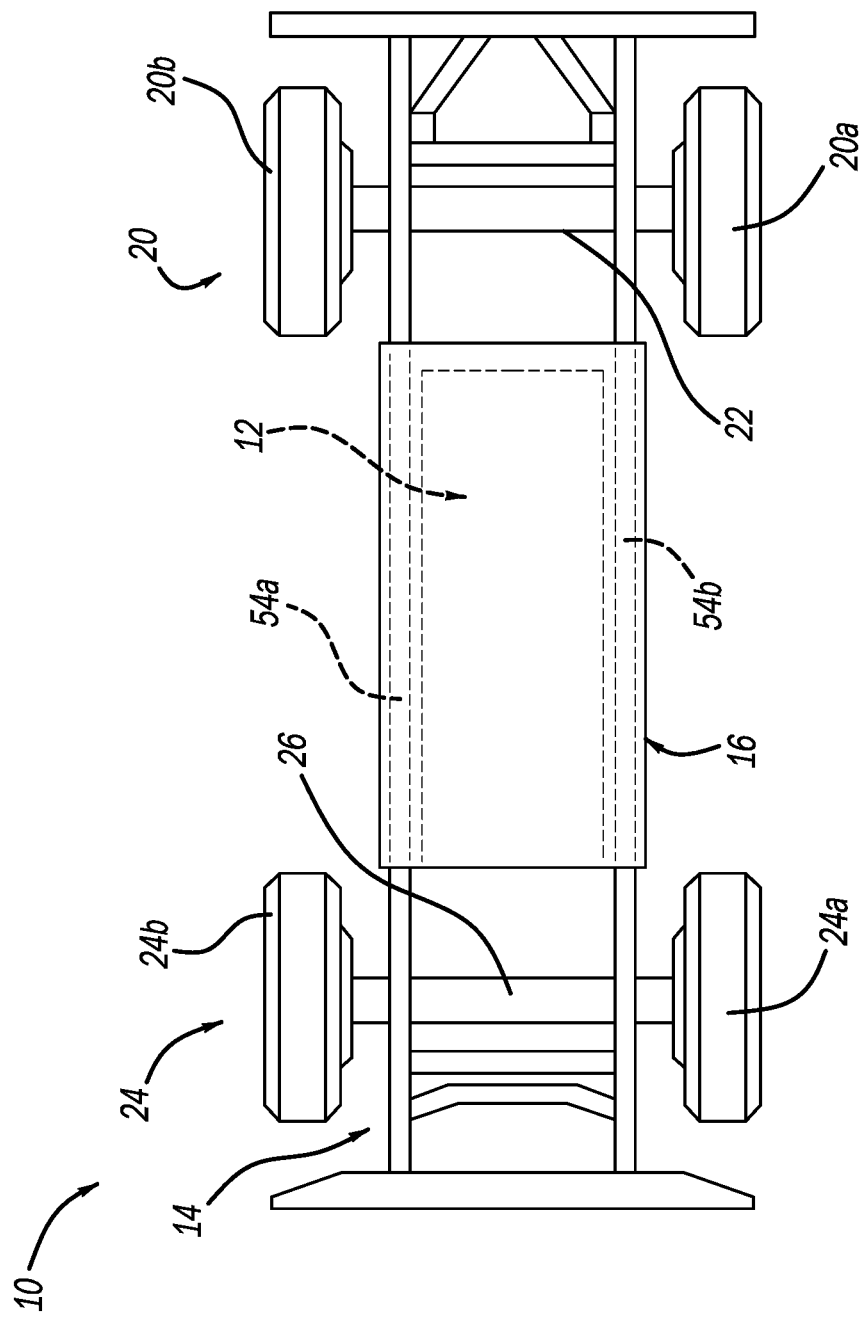
FIG. 1 is a schematic view of a vehicle including a battery pack mounting structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
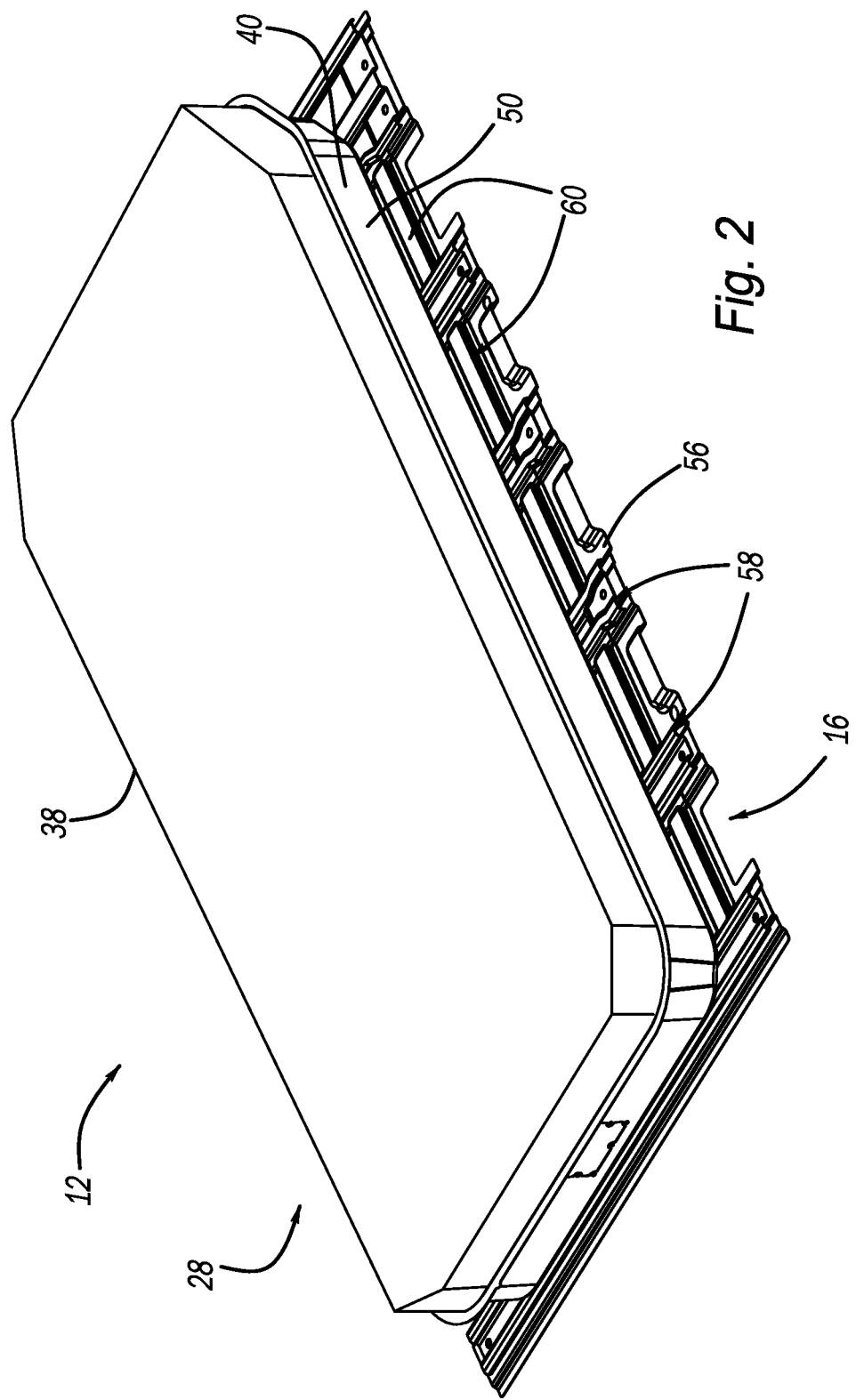
FIG. 2 is a perspective view of the battery pack mounting structure and a battery pack of FIG. 1.
Figure 3:
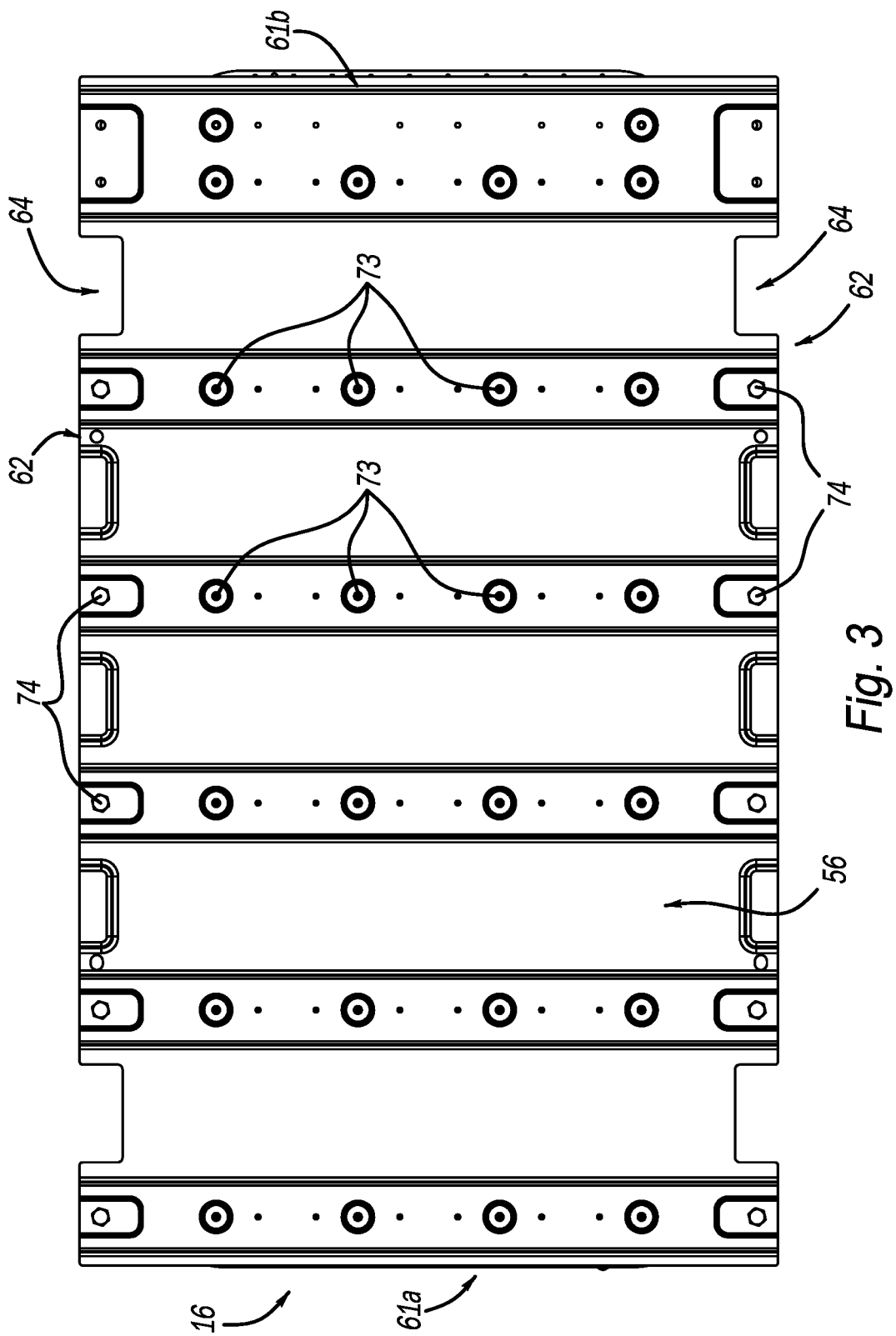
FIG. 3 is a bottom view of the battery pack mounting structure of FIG. 1.

With reference to FIGS. 1 and 2, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery housing assembly 12, a vehicle frame 14 and a battery mounting structure 16. The battery housing assembly 12 powers one or more electric motors (e.g., a rear motor and/or a front motor, not shown) to drive rear wheels 20a, 20b of a set of rear wheels 20 via a rear axle 22, and/or to drive front wheels 24a, 24b of a set of front wheels 24 via a front axle 26.

With additional reference to FIGS. 3-7, the battery housing assembly 12 includes one or more battery arrays (not shown) and a battery tray or housing 28. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units, e.g., capacitors or supercapacitors. Accordingly, the battery arrays are also referred to herein as power storage unit arrays. In some forms, the battery arrays are stacked on top of each other.

Figure 4:
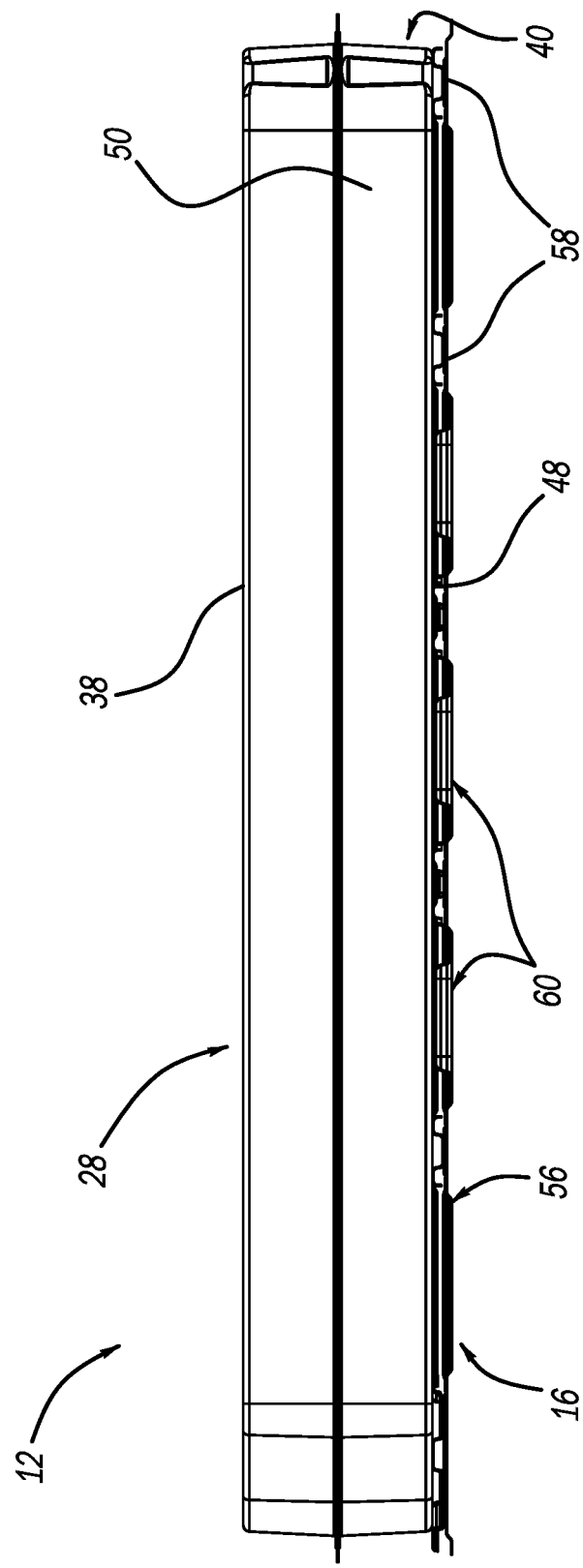
FIG. 4 is a side view of the battery pack mounting structure and battery pack of FIG. 1.
Figure 5:
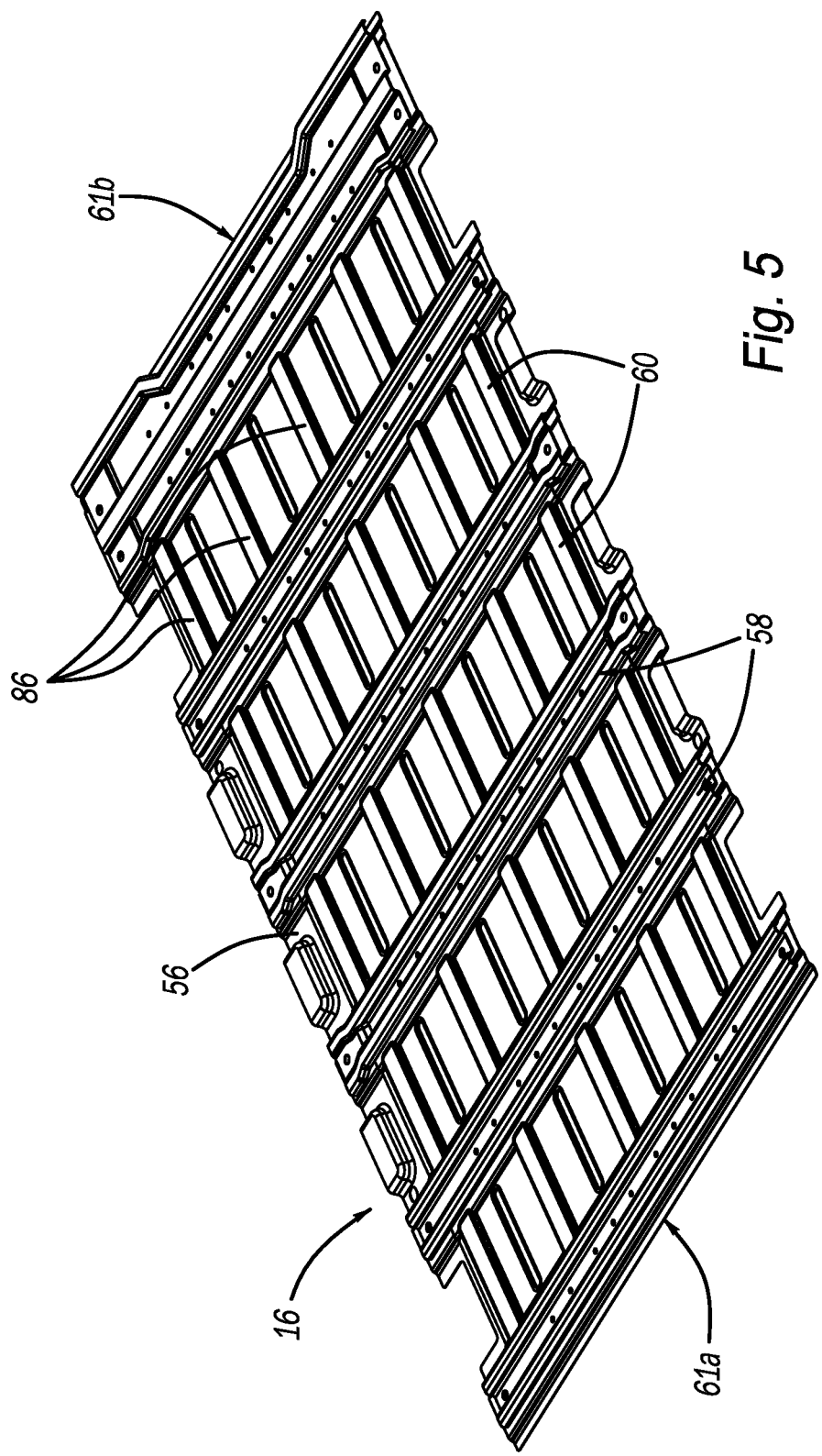
FIG. 5 is a perspective view of the battery pack mounting structure of FIG. 1.
Figure 6:
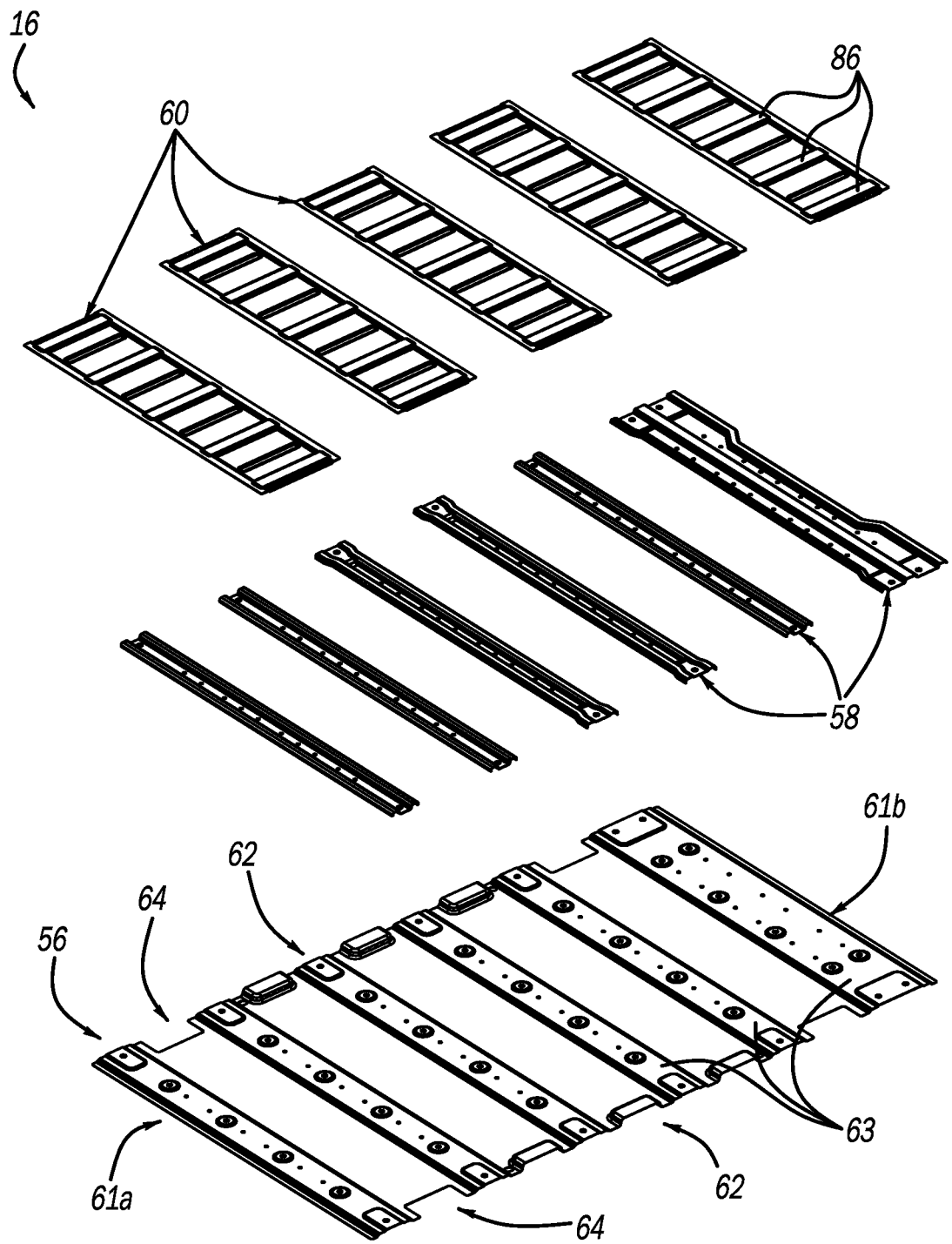
FIG. 6 is an exploded perspective view of the battery pack mounting structure of FIG. 1.
Figure 7:
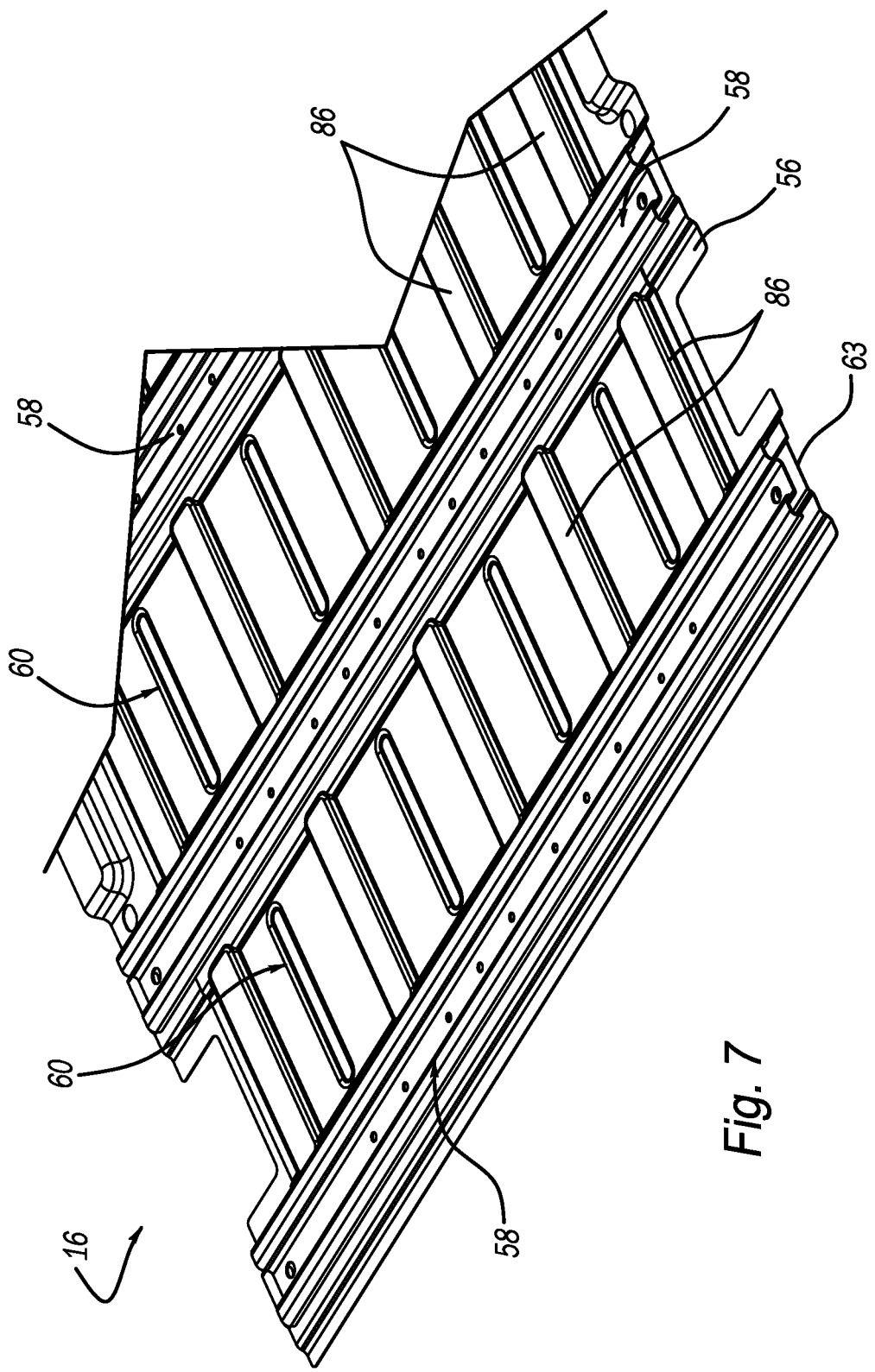
FIG. 7 is a perspective view of a portion of the battery pack mounting structure of FIG. 1.

The battery housing 28 may disposed at various locations of the vehicle 10 (e.g., a midsection between the front axle 26 and the rear axle 22) and is mounted to the vehicle frame 14. In this way, the battery housing 28 is supported by the vehicle frame 14 and is remote from a passenger cabin (not shown) and cargo compartments (not shown) of the vehicle 10, therefore, not occupying space that would otherwise be available for passengers or cargo. The battery housing 28 includes a lid 38 (FIGS. 2 and 4) and a body 40 (FIGS. 2 and 4). The lid 38 may at least partially overlap the body 40 and is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 and one or more side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the body 40 and are secured to each other, such as via welding or an adhesive, for example. A seal (not shown) is disposed around a periphery of the side walls 50 of the battery housing 28 and is engaged with side walls 50 and the lid 38. In this way, fluids, debris and other materials are inhibited from entering into the battery housing 28.

The vehicle frame 14 is the main supporting structure of the vehicle to which various components are attached either directly or indirectly. The vehicle frame 14 includes opposed longitudinal rails 54a, 54b. The rails 54a, 54b are spaced apart from each other and may establish a length of the vehicle frame 14.

The battery mounting structure 16 is removably secured to the vehicle frame 14 and the battery housing 28. In this way, the mounting structure 16 mounts the battery housing 28 to the vehicle frame 14. The mounting structure 16 protects the battery housing assembly 12 during vehicle operation and comprises a shear plate 56, a plurality of cross members or beams 58 and a plurality of reinforcement plates 60.

In the example illustrated, the shear plate 56 is a generally rectangular stamping and is spaced apart from the bottom wall 48 of the battery housing 28 (FIG. 4). The shear plate 56 extends along a length of the vehicle 10 and covers an entire footprint of the bottom wall 48. Stated differently, the shear plate 56 has a surface area that is greater than a surface area of the bottom wall 48 of the battery housing 28. In other words, the shear plate 56 extends outward of the battery housing 28 in the forward, rearward, left, and right directions of the vehicle 10. The shear plate 56 includes a fore end 61a located at or near a front end of the vehicle 10 and an aft end 61b located at or near a rear end of the vehicle 10. The shear plate 56 includes stiffening beads 63 that are spaced apart in a longitudinal direction of the vehicle 10 and increase the stiffness of the shear plate 56. In the example illustrated, the stiffening beads 63 extend in a transverse direction of the vehicle 10. The shear plate 56 is also made of a metal material and includes opposing sides 62 having one or more cutouts 64 formed therein. In this way, handling and assembling the shear plate 56 to the battery housing 28 and the vehicle frame 14 is facilitated. In the example illustrated, the cutouts 64 have a generally rectangular shape. In other forms, the cutouts 64 include other suitable shapes such as square or semi-circular, for example.

In some forms, brackets (not shown) are secured to a respective sidewall 50 of the battery housing 28 and are spaced apart along a longitudinal direction of the vehicle 10. The brackets have a generally L-shape and include a vertical extending portion and a horizontal extending portion. The vertical extending portion is secured to the respective sidewall 50 of the battery housing 28 and the horizontal extending portion is positioned between and secured to a respective cross beam 58 and a respective longitudinal rail 54a, 54b.

The cross beams 58 are disposed between the shear plate 56 and the bottom wall 48 of the battery housing 28 and extend in a transverse direction of the vehicle 10. The cross beams 58 are also secured to the stiffening beads 63 of the shear plate 56 and to the bottom wall 48 of the battery housing 28. In some forms, the cross beams 58 are welded to the bottom wall 48 of the battery housing 28 and/or to the stiffening beads 63 of the shear plate 56. The cross beams 58 are spaced apart from each other and are aligned with each other in the longitudinal direction of the vehicle 10. Once the reinforcement plates 60 are secured onto the shear plate 56, a set of first fasteners 73 extends through a center portion of the shear plate 56, a center portion of respective cross beams 58 and the battery housing 28, thereby securing the shear plate 56, the cross beams 58 and the battery housing 28 to each other. A set of second fasteners 74 extends through a respective side 62 of the shear plate 56, an end of a respective cross beam 58, and a respective longitudinal rail 54a, 54b, thereby connecting the shear plate 56, the respective cross beam 58, and the respective longitudinal rail 54a, 54b to each other.

With reference to FIGS. 4-7, the plurality of reinforcement plates 60 are made of a metal material that is different than the metal material of the shear plate 56. The metal material of the reinforcement plates 60 has a greater ductility (or stiffness) than the metal material of the shear plate 56. In one example, the reinforcement plates are made of boron steel and the shear plate 56 is made of carbon steel or high strength steel. In another example, each of the reinforcement plates 60 are made of a metal comprising a different steel alloy. In the example illustrated, the plurality of reinforcement plates 60 are also separate from the shear plate 56 and are mounted onto the upper surface of the shear plate 56 such that the reinforcement plates 60 are disposed between the shear plate 56 and the bottom wall 48 of the battery housing 28. In this way, the reinforcement plates 60 are disposed underneath the battery housing 28 at predetermined locations to protect the battery housing 28 from debris during operation (e.g., driving off road and/or on road). In the example illustrated, the reinforcement plates are welded onto the upper surface of the shear plate 56. In some forms, the reinforcement plates 60 can be mounted onto the upper surface of the shear plate 56 by mechanical fasteners, adhesives, or any other suitable attachment means.

In the example illustrated, the reinforcement plates 60 are spaced apart from each other and are aligned with each other in the longitudinal direction of the vehicle 10. Stated differently, each reinforcement plate 60 is disposed between two adjacent cross beams 58 of the plurality of cross beams 58. In some forms, the reinforcement plates 60 are positioned between and welded to the cross beams 58 to form a first subassembly. The first subassembly is then welded onto the upper surface of the shear plate 56 to form a second subassembly. The second subassembly is then welded to the battery housing 28.

In the example illustrated, the reinforcement plates 60 extend in a transverse direction (i.e., left-right direction) of the vehicle 10. In some forms, the reinforcement plates 60 extend in the longitudinal direction (i.e., forward-rearward direction) of the vehicle 10. In some forms, the reinforcement plates 60 extend in an oblique direction of the vehicle 10. In some forms, some of the reinforcement plates 60 extend in a transverse direction of the vehicle 10, some of the reinforcement plates extend in the longitudinal direction of the vehicle 10, and some of the reinforcement plates 60 extend in the oblique direction of the vehicle 10. In this way, the reinforcement plates 60 are oriented in predetermined configurations to protect predetermined areas of the battery housing 28 from debris or objects during operation.

The reinforcement plates 60 are vertically spaced apart from the bottom wall 48 of the battery housing 28 and have a length that is shorter than a width of the shear plate 56. The reinforcement plates 60 also are made of a thickness that is greater than a thickness of the shear plate 56. In one example, the thickness of the reinforcement plates 60 are two (2) times greater than the thickness of the shear plate 56. In another example, the thickness of the reinforcement plates 60 are five (5) times greater than the thickness of the shear plate 56.

Each reinforcement plate 60 includes stiffening beads 86 that are spaced apart in a transverse direction of the vehicle 10 and increase the stiffness of the reinforcement plate 60. In the example illustrated, the stiffening beads 86 extend in the longitudinal direction of the vehicle 10. In some forms, the stiffening beads 86 may extend in the transverse direction and/or an oblique direction of the vehicle 10.

During an impact event where a lateral force acts on the vehicle 10, the shear plate 56 and the cross beams 58 cooperate to direct or transfer the energy across the cross beams 58 and away from the battery housing assembly 12. During an impact event where a vertical force acts on the shear plate 56, the energy is directed or transferred to the cross beams 58 and away from the battery housing assembly 12. For example, if the vertical force acts on a lower surface of the shear plate 56 at a location between the cross beams 58, the energy is transferred to the cross beams 58 by way of the shear plate 56 and the reinforcement plates 60 positioned between the cross beams 58.

The battery mounting structure 16 of the present disclosure, including the shear plate 56 and separate reinforcement plates 60, facilitates manufacturing compared to a single plate having the same thickness. The battery mounting structure 16 of the present disclosure, including the shear plate 56 and separate reinforcement plates 60, also has less weight than a single plate having the same thickness. The battery mounting structure 16 of the present disclosure, including a flat, thin shear plate 56, provides aerodynamic benefits for the vehicle 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery mounting structure for mounting a battery housing assembly to a vehicle frame of a vehicle, the battery housing assembly including a battery housing and power storage units within the battery housing, the battery mounting structure comprising:
- a shear plate extending in a longitudinal direction of the vehicle and including a first thickness; and
- a plurality of separate reinforcement plates disposed between the shear plate and the battery housing and mounted on an upper surface of the shear plate, the reinforcement plates spaced apart from each other and include a second thickness,
- wherein the second thickness is greater than the first thickness.

2. The battery mounting structure of claim 1, wherein the reinforcement plates are aligned with each other in the longitudinal direction of the vehicle.

3. The battery mounting structure of claim 1, wherein the reinforcement plates extend in a transverse direction of the vehicle.

4. The battery mounting structure of claim 1, wherein the shear plate is made of a first material and the reinforcement plates are made of a second material, and wherein the first material and the second material are different from each other.

5. The battery mounting structure of claim 4, wherein the first material has a greater ductility than the second material.

6. The battery mounting structure of claim 1, wherein the shear plate includes stiffening beads spaced apart in a transverse direction of the vehicle.

7. The battery mounting structure of claim 1, wherein the shear plate is flat.

8. The battery mounting structure of claim 1, wherein each reinforcement plate includes stiffening beads spaced apart in a transverse direction of the vehicle.

9. The battery mounting structure of claim 8, wherein the stiffening beads extend in the longitudinal direction of the vehicle.

10. The battery mounting structure of claim 1, wherein each reinforcement plate of the reinforcement plates is made of a different material.

11. The battery mounting structure of claim 1, wherein the reinforcement plates are welded to the upper surface of the shear plate.

12. A battery mounting structure for mounting a battery housing assembly to a vehicle frame of a vehicle, the battery housing assembly including a battery housing and power storage units within the battery housing, the battery mounting structure comprising:
- a shear plate extending in a longitudinal direction of the vehicle and including a first thickness;
- a plurality of cross beams secured to an upper surface of the shear plate and secured to the battery housing, the cross beams spaced apart from each other and extending in a transverse direction of the vehicle; and
- a plurality of separate reinforcement plates disposed between the shear plate and the battery housing and mounted on the upper surface of the shear plate, each reinforcement plate disposed between two adjacent cross beams of the plurality of cross beams and including a second thickness,
- wherein the second thickness is greater than the first thickness.

13. The battery mounting structure of claim 12, wherein a set of fasteners extend through the shear plate, a respective cross beam of the cross beams, and configured to extend through the vehicle frame to secure the shear plate, the respective cross beam and the vehicle frame to each other.

14. The battery mounting structure of claim 12, wherein the reinforcement plates are aligned with each other in the longitudinal direction of the vehicle.

15. The battery mounting structure of claim 12, wherein the shear plate is made of a first material and the reinforcement plates are made of a second material, and wherein the first material and the second material are different from each other.

16. The battery mounting structure of claim 12, wherein each reinforcement plate includes stiffening beads spaced apart in a transverse direction of the vehicle.

17. The battery mounting structure of claim 16, wherein the stiffening beads extend in the longitudinal direction of the vehicle.

18. A vehicle comprising:
- a battery housing; and
- a battery mounting structure mounting the battery housing to a vehicle frame of the vehicle, the battery mounting structure comprising:
  - a shear plate extending in a longitudinal direction of the vehicle and including a first thickness;
  - a plurality of cross beams secured to an upper surface of the shear plate and to the battery housing, the cross beams spaced apart from each other and extending in a transverse direction of the vehicle; and
  - a plurality of separate reinforcement plates disposed between the shear plate and the battery housing and mounted on the upper surface of the shear plate, each reinforcement plate disposed between two adjacent cross beams of the plurality of cross beams and including a second thickness,
- wherein the second thickness is greater than the first thickness.

19. The vehicle of claim 18, wherein the reinforcement plates are aligned with each other in the longitudinal direction of the vehicle.

20. The vehicle of claim 18, wherein the reinforcement plates are vertically spaced apart from the battery housing.

* * * * *